(12) United States Patent
Jones et al.

(10) Patent No.: US 10,228,027 B2
(45) Date of Patent: Mar. 12, 2019

(54) INTEGRATED MULTI-POSITION FORCE LUBRICATION SYSTEM

(71) Applicant: Twin Disc, Inc., Racine, WI (US)

(72) Inventors: Darrel A. Jones, Kenosha, WI (US); Andrew D. Van Hoorn, Franklin, WI (US)

(73) Assignee: Twin Disc, Inc., Racine, WI (US)

( * ) Notice: Subject to any disclaimer, the term of this patent is extended or adjusted under 35 U.S.C. 154(b) by 197 days.

(21) Appl. No.: 15/433,532

(22) Filed: Feb. 15, 2017

(65) Prior Publication Data

US 2017/0241488 A1 Aug. 24, 2017

Related U.S. Application Data

(60) Provisional application No. 62/296,978, filed on Feb. 18, 2016.

(51) Int. Cl.
| | |
|---|---|
| *B60K 17/02* | (2006.01) |
| *B60K 17/28* | (2006.01) |
| *F16D 25/12* | (2006.01) |
| *B60K 25/00* | (2006.01) |
| *F16D 13/52* | (2006.01) |
| *F16D 67/04* | (2006.01) |
| *B60T 1/06* | (2006.01) |
| *B60K 25/02* | (2006.01) |

(52) U.S. Cl.
CPC ............ *F16D 25/123* (2013.01); *B60K 17/02* (2013.01); *B60K 17/28* (2013.01); *B60K 25/00* (2013.01); *B60T 1/062* (2013.01); *F16D 13/52* (2013.01); *F16D 67/04* (2013.01); *B60K 25/02* (2013.01); *B60K 2025/022* (2013.01); *B60K 2025/026* (2013.01); *F16D 2300/06* (2013.01); *F16D 2300/26* (2013.01)

(58) Field of Classification Search
CPC ........ B60K 17/02; B60K 17/28; B60K 25/00; B60K 25/02; B60K 2025/022; B60K 2025/026; F16D 25/123; F16D 13/52; F16D 67/04; F16D 2300/06; F16D 2300/26
See application file for complete search history.

(56) References Cited

U.S. PATENT DOCUMENTS

| | | |
|---|---|---|
| 5,014,741 A | 5/1991 | Taguchi |
| 5,524,508 A | 6/1996 | Peters |
| 6,224,289 B1 * | 5/2001 | Redd ..................... B60K 25/06 403/337 |
| 6,227,333 B1 | 5/2001 | Scheib et al. |

(Continued)

*Primary Examiner* — Ramya P Burgess
*Assistant Examiner* — David R Morris
(74) *Attorney, Agent, or Firm* — Boyle Fredrickson S.C.

(57) ABSTRACT

A hydraulic power take-off, PTO, is provided for use with industrial drives. The hydraulic power take-off has a multi-position adapter that allows the PTO to be attached to a prime mover in a multitude of angularly indexed positions while maintaining a gravity-assisted drain and sump for the hydraulic fluid. The multi-position adapter is indexable to selectively block and allow for passage of oil from a tower housing to a clutch housing thus ensuring the hydraulic oil properly drains. As a result, the tower housing is also indexable which allows the PTO unit to be installed in a number of different configurations to meet the demands of the prime mover and the final application of the industrial machine.

11 Claims, 11 Drawing Sheets

(56) References Cited

U.S. PATENT DOCUMENTS

| | | | | |
|---|---|---|---|---|
| 6,305,515 B1 | 10/2001 | Heidenreich et al. | | |
| 8,312,858 B2* | 11/2012 | McClave | ................. | F01M 1/02 |
| | | | | 123/196 R |
| 8,408,363 B2* | 4/2013 | Richard | ................. | B60K 17/28 |
| | | | | 184/35 |
| 8,561,283 B1 | 10/2013 | McCombs et al. | | |
| 8,727,923 B2 | 5/2014 | Huelsemann | | |
| 8,808,129 B2* | 8/2014 | List | .................... | F16H 61/0031 |
| | | | | 475/159 |
| 8,991,274 B2* | 3/2015 | Tuttle | .................... | B60K 25/00 |
| | | | | 180/53.1 |
| 9,360,100 B2* | 6/2016 | McCombs | ............. | B21D 22/16 |
| 2009/0000871 A1* | 1/2009 | McClave | ................. | F01M 1/02 |
| | | | | 184/6.5 |
| 2010/0125023 A1 | 5/2010 | List et al. | | |
| 2011/0174578 A1* | 7/2011 | Richard | ................. | B60K 17/28 |
| | | | | 184/35 |
| 2011/0195811 A1* | 8/2011 | Huelsemann | ........ | B60K 7/0007 |
| | | | | 475/5 |
| 2011/0293444 A1* | 12/2011 | Bariau | .................... | F01C 17/02 |
| | | | | 417/319 |
| 2013/0123053 A1 | 5/2013 | Haupt et al. | | |
| 2014/0007715 A1* | 1/2014 | Tuttle | .................... | B60K 25/00 |
| | | | | 74/11 |
| 2014/0020505 A1 | 1/2014 | McCombs et al. | | |
| 2017/0241494 A1* | 8/2017 | Jones | ...................... | F16D 55/24 |
| 2017/0241496 A1* | 8/2017 | Jones | ...................... | F16D 13/52 |

\* cited by examiner

SECTION A-A

INTEGRATED MULTI-POSITION FORCE LUBRICATION SYSTEM

CROSS REFERENCE TO RELATED APPLICATIONS

This application claims the benefit of priority under 35 USC § 119(e) to U.S. Provisional Patent Application No. 62/296,978, filed Feb. 18, 2016, the entire contents of which are hereby expressly incorporated by reference into the present application.

BACKGROUND OF THE INVENTION

Field of the Invention

The preferred embodiments are directed to an industrial hydraulic power take-off unit (PTO) and more particularly, to a hydraulic PTO which does not require a clutch adjustment and which allows for maximum side load capability. The invention can be used wherever a disconnect is required between the driven equipment and the prime mover. The inventive PTO may be used in any stationary or mobile applications such as within the wood chipping industry where wood chippers are configured to chip whole trees of a large diameter, or perhaps on an agricultural tractor, dump truck, boom, winch, or the like.

Discussion of the Related Art

Hydraulic PTO units have been known to be used in a variety of applications. Historically, a single PTO unit was developed in such a way that it could be used in a number of applications with a number of different power sources. For example, one PTO design may be used to power a generator, a winch, a centrifugal pump, a blower, a compressor, and a fan. Each one of these applications may require a unique power source, such as a large diesel engine, a small gas engine, or anything in between or similar Each unique application may also have a unique housing for the engine and PTO. For example, a generator will have a unique housing and footprint compared to that of a centrifugal pump.

When configuring the PTO for use with each individual application, proper care must be taken in order to ensure that lubricating oil within the unit sufficiently flows through the necessary areas of the assembly. Due to the unique configuration of each engine and machine housing, the PTO unit is typically installed in various positions/angles, depending on the application. As proper flow of lubricating oil is critical to PTO longevity and performance, ancillary hydraulic lines, pumps, and reservoirs are commonly installed to ensure the lubricating oil reaches all the necessary components and properly drains. Known PTO units therefore require customization for each application.

Some PTOs have tower sections with tower drive ears or pads for driving accessories that extend outwardly from the main PTO housings that hold clutches and brakes of the PTOs. Different applications require different tower orientations relative to the main PTO housings, which can present challenges for the oil flow path routing for shared lubrication of the tower sections and main PTO housings. Accordingly, gravity could not be relied on to properly drain the oil to a wet sump, since each installation of the PTO most often requires a unique orientation. As a result, different tower orientations require different oil plumbing kits, including changing a current tower orientation to a different tower orientation if a machine gets reconfigured.

Oil plumbing kits or adding supplemental hydraulic lines, pumps, and reservoirs to the PTO adds significant expense to the hardware as well as significant expense to the installation of the PTO. In order to keep design costs down, the design of the PTO would not be changed for each unique application. What is therefore needed is a PTO that is configured for installation in a variety of applications and can easily adapt to properly flow the lubricating oil, regardless of the orientation of the device. What is also needed is a PTO that can be adaptable without adding costly additional hydraulics including lines, pumps, and reservoirs. Finally, what is needed is a PTO lubrication system that uses gravity as the draining force of the lubrication system regardless of the orientation of the PTO.

SUMMARY OF THE INVENTION

The preferred embodiments overcome the above-noted drawbacks by providing a heavy-duty industrial PTO that can be implemented in a variety of systems with gravity-assisted hydraulic oil drains.

The prime mover for the inventive PTO can ideally be driven up to at least 1,243 horsepower (hp) at 1,800 revolutions per minute (rpm). The PTO is designed to withstand such demanding work conditions. The inventive PTO is ideal for a wide range of applications such as driving pumps, grinders, crushers, dredgers, chippers, shredders, heavy-duty drills, and more.

The inventive PTO has a modular design allowing suitability for both side-load "P" and in-line "I" applications with the simple change of bearing carriers. An advanced control system, allowing for smooth engagement of the driven equipment, may also be utilized. Another feature is a pair of auxiliary drive pump pads with approximately 400 hp maximum capacity per tower, or about 550 hp maximum for both towers. The pump towers are rotatable by approximately 0°, 45°, and 90°, either clockwise or counter-clockwise, to allow for clearance in installation.

The pump tower(s) preferably have at least two pump pads each. A wide variety of pump pads may be suitable for this purpose, such as SAE "A", SAE "B", SAE "C", SAE "D", SAE "E", or similar In some embodiments, it may be desired or necessary to customize a pump pad for a specific PTO. The PTO may utilize an input housing similar to SAE #0, SAE #1, SAE #2, SAE #3, SAE #4, SAE #5, SAE #6, or any other preferably SAE size to prevent burnup in performance applications. The PTO may also utilize SAE 460, or SAE 355 input coupling or alternatively a flexible coupling. In some embodiments, the pump tower(s) may include an optional speed increase to handle the stress of higher engine speeds.

The inventive PTO also optionally features an integrated hydraulic sump. Unlike a separate, externally mounted sump/reservoir, the integrated sump saves space and reduces installation cost. An innovative design, it allows for the installation of the standard charge/lube pump on a separate pad, freeing up all four auxiliary pads for customer use.

A spring applied, hydraulically released brake (SAHR) has been added as a standard feature. An integral, mechanical brake release allows the output shaft to easily be rotated during service intervals of the driven equipment.

An innovative, high-capacity brake with control logic is offered as an option. It slows the output when driving large masses in a shorter amount of time than conventional systems.

The inventive PTO also utilizes an oil-filled, multiple disc, hydraulically actuated self-adjusting clutch. The inventive PTO has therefore been developed with a number of unique features that offer reliability, productivity, and power, including: integral mechanical brake release, optional integrated reservoir, and optional hydraulic gear pump. The inventive PTO may therefore be used in a wide range of heavy-duty applications including crushers, grinders, mulchers, dredgers, heavy-duty drills, and the like.

The industrial hydraulic power take-off "PTO" includes a housing mounted between a prime mover and a piece of driven equipment. The housing includes a hydraulic section having a clutch housing with multiple passages directing oil throughout the PTO. Preferably, the clutch is a hydraulically actuated and self-adjusting clutch. Mechanical clutches tend to need adjusting of their actuating cable, whereas hydraulic clutches are usually self-adjusting. The self-adjusting clutch additionally allows for a high side-load capability.

A tower housing may also have multiple passages directing oil through the tower housing. The tower housing is configured to connect to the clutch housing in multiple angularly indexed positions with respect to the clutch housing.

An embodiment may utilize an actuator to switch, move, or adjust a secondary mechanism. The actuator may be a remote actuator, switch-input actuator, or any known or contemplated actuator to supply remote, operator-induced, or automated actuation of a secondary mechanism without departing from the spirit of the invention.

Pilot bearings wear down, and a worn down or damaged pilot bearing creates high volume noises and may cause a transmission to jump out of gear as well as creates the potential for catastrophic transmission failure. The inventive PTO circumvents these potential problems by not utilizing a pilot bearing.

In order to facilitate the indexing of the tower housing with respect to the clutch housing, a multi-position adapter is arranged between the tower and clutch housings. The multi-position adapter includes spaced-apart openings that align with various passages of the hydraulic and tower housings. When selecting an angularly indexed position to mount the tower housing with respect to the clutch housing, the multi-position adapter defines corresponding oil flow paths between respective ones of the passages of the hydraulic and tower housing and blocks flow through the remainder of the passages of the hydraulic and tower housings. This allows for the PTO to operate with a gravity drained hydraulic oil system with a common sump at the lowest point of the clutch housing, despite the indexed orientation of the adjustable tower housing.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose. For example, the words "connected", "attached", "coupled", or terms similar thereto are often used. They are not limited to direct connection but include connection through other elements where such connection is recognized as being equivalent by those skilled in the art.

DETAILED DESCRIPTION OF PREFERRED EMBODIMENTS

Figure 1:
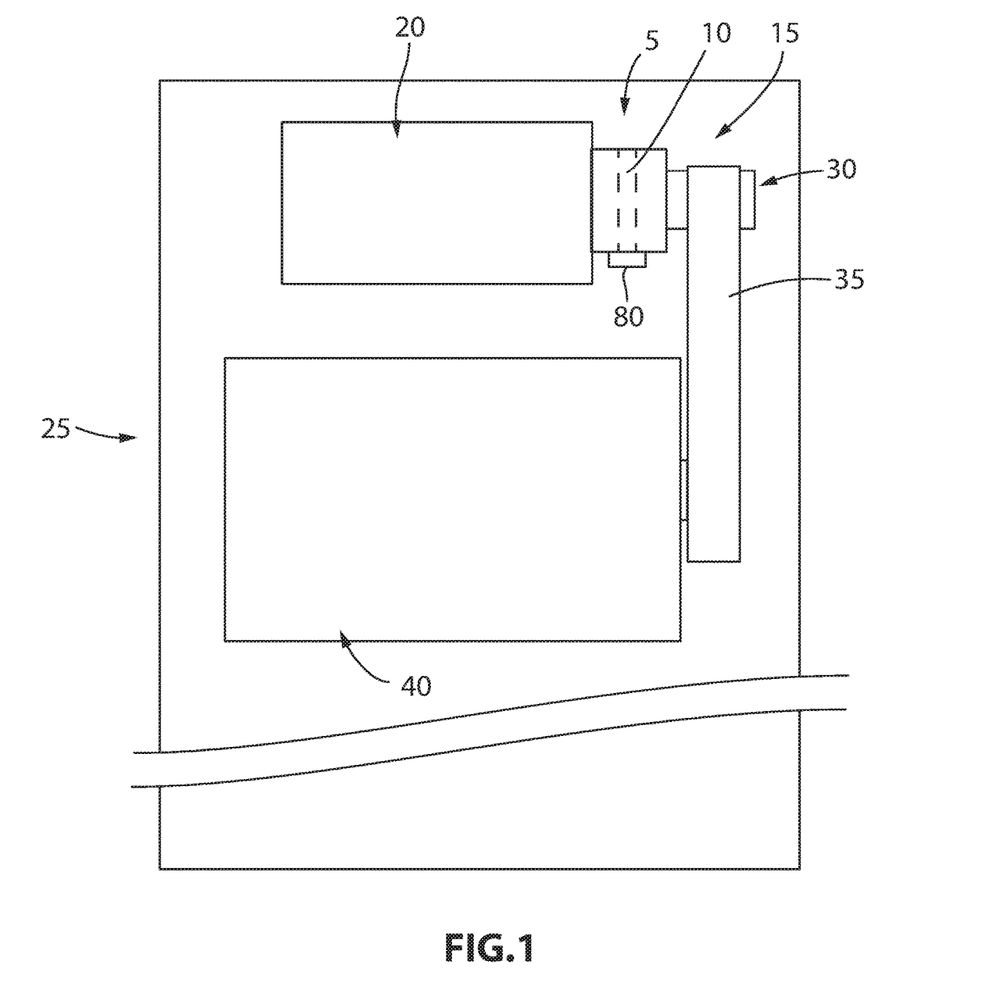
FIG. 1 is a simplified schematic representation of a piece of industrial equipment with an industrial drive incorporating a hydraulic PTO (power take-off) with a multiple-position force lubrication system.

Referring now to the simplified schematic representation in FIG. 1, a hydraulic PTO (power take-off) 5 with a multi-position forced lubrication system 10 and including a sump 80 is shown implemented in an industrial drive 15. The industrial drive 15 delivers power from a prime mover 20, which may be a high-power internal combustion engine, to a piece of industrial equipment 25. Industrial drive 15 is shown here configured for side-load power delivery and includes a pulley arrangement 30 and belt(s) 35 that transmit power from hydraulic PTO 5 to a driven component(s) of the industrial equipment 25. The drive need not be limited to a pulley arrangement 30 and belt(s) 35 as shown, but may be any known drive such as direct drive, chain drive, or the like.

The industrial equipment 25 may be, for example, a whole-tree chipper or other industrial wood chipper, a heavy-duty pump system, a grinder, a crusher, a dredge, a shredder, or a heavy-duty drill system that has a large rotating mass such as a rotatable component(s) 40 that establishes large inertial loads while rotating.

Hydraulic oil is circulated throughout the hydraulic PTO 5 to lubricate bearings and other components and to hydraulically actuate various components such as clutch and brake assemblies that transmit power from the prime mover 20 to the power equipment 25. In order to simplify the hydraulics, the oil is gravity drained to a common integrated sump at the bottom of the hydraulic PTO 5, as explained in greater detail herein.

Figure 2:
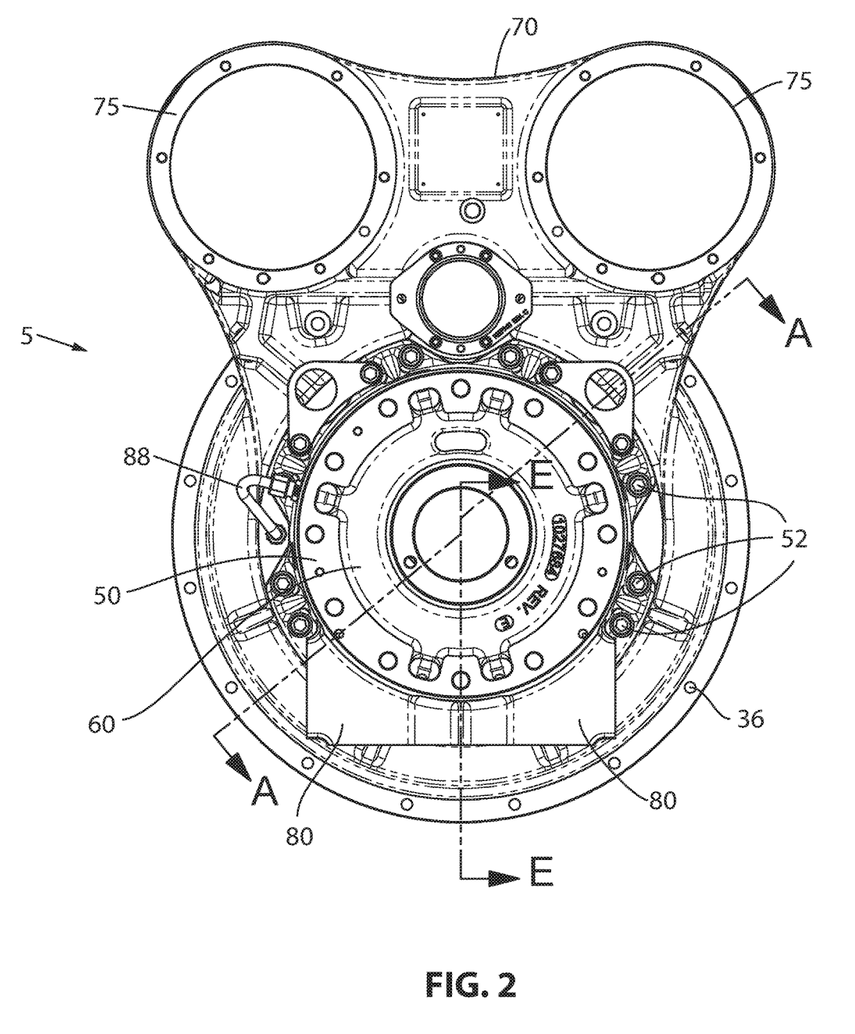
FIG. 2 is a pictorial end view of the hydraulic PTO of FIG. 1.

Referring now to FIG. 2, the body of the hydraulic PTO 5 is made up of a tower housing 70 and a main PTO housing or clutch housing 50 that houses a clutch and brake assembly. The tower housing 70 can be mounted to the prime mover 20 (FIG. 1) in a plurality of ways by clocking, or rotating, the clutch housing 50 with respect to the tower housing 70. A series of fasteners 52 may be removed to allow for the clocking action and reattached once the tower housing 70 is in a suitable location for proper attachment to the prime mover 20. As shown in FIG. 2, for example, a pair of pump pads 75 is in a vertical orientation with the tower housing 70 affixed to the clutch housing 50 with fasteners 52. An additional feature shown is a vent line 88, which allows for pressure equalization of the various oil ports within the hydraulic PTO 5.

Figure 3:
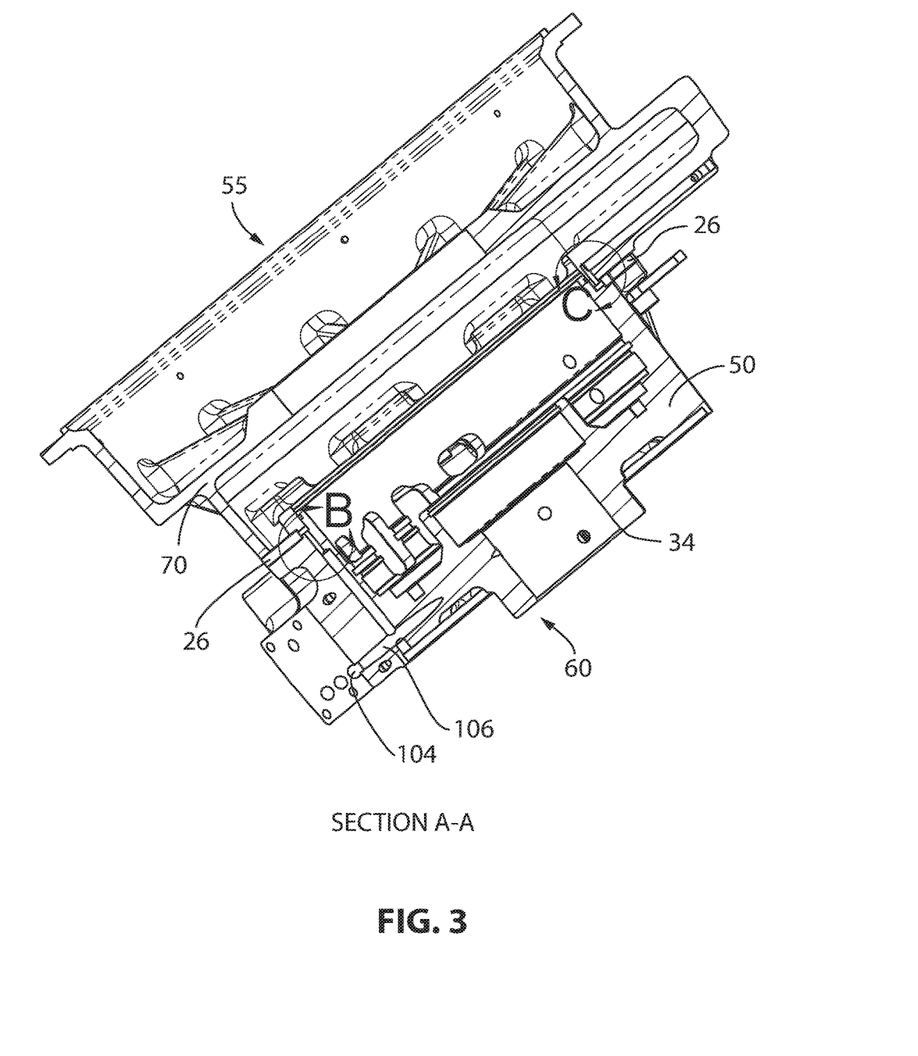
FIG. 3 is a cross-section view along section line A:A of the hydraulic PTO of FIG. 2.
Figure 4:
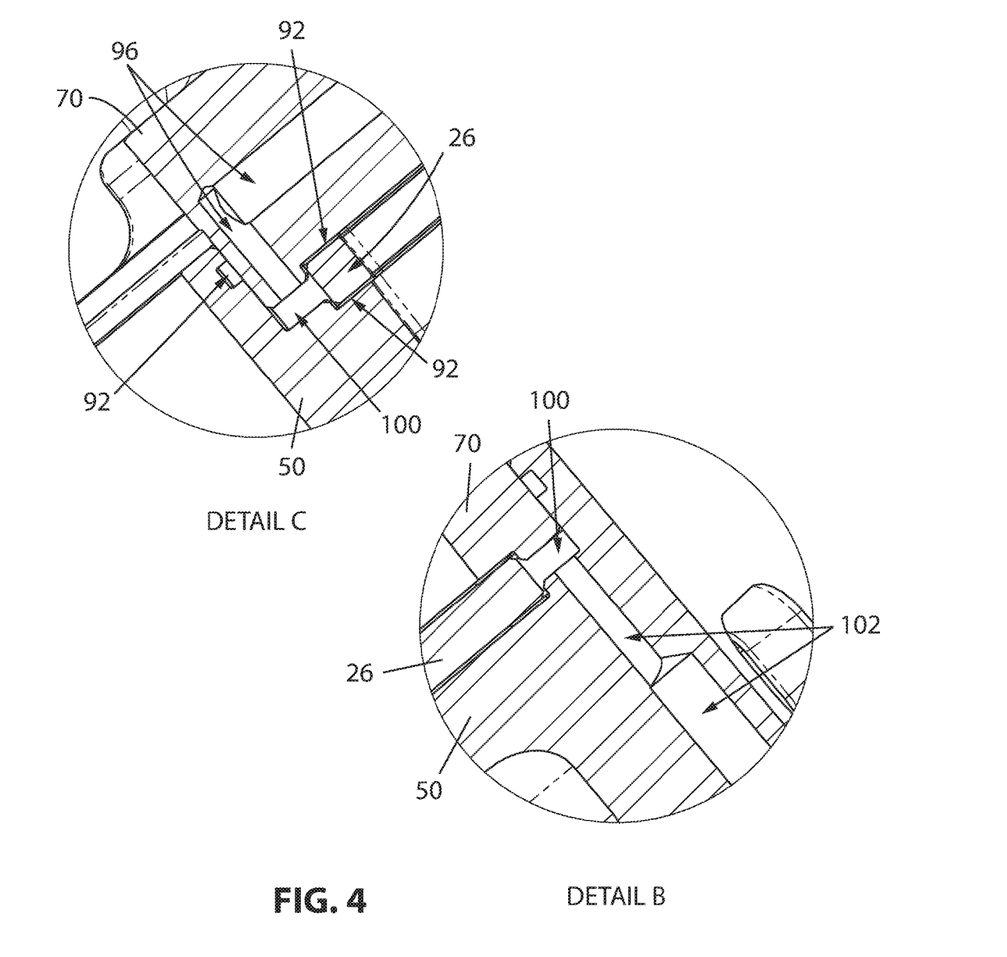
FIG. 4 is a close-up view of Detail C and Detail B of the hydraulic PTO of FIG. 3.
Figure 5:
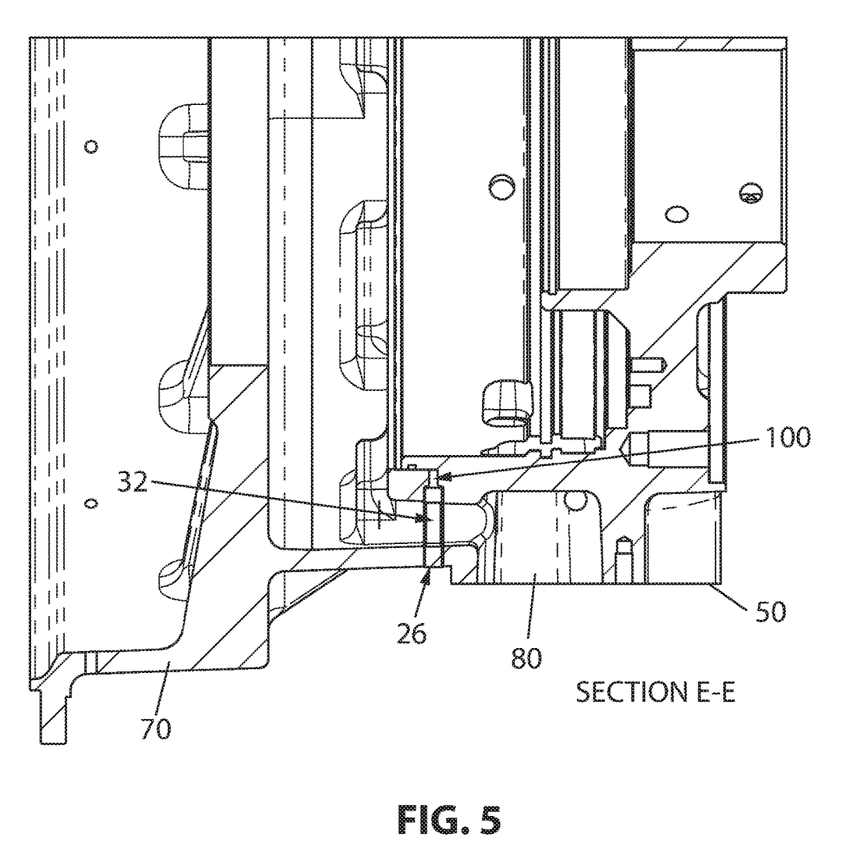
FIG. 5 is a cross-section view along section line E:E of the hydraulic PTO of FIG. 2.

Referring to FIGS. 2 and 3, hydraulic PTO 5 includes an input end 55 configured for attachment to a variety of different prime movers 20 (FIG. 1) and an output end 60 configured to drive a plurality of devices with the output drive 34. The tower housing 70 and two pump pads 75 are arranged between the input end 55 and output end 60 of the hydraulic PTO 5. The pump pads 75 may be configured to drive a plurality of devices. The hydraulic PTO 5 may be attached to a prime mover 20, as shown, for example, in FIG. 1, with a series of mounting holes 36 in a plurality of orientations. In any orientation, hydraulic oil flows within the hydraulic PTO 5 through a series of passages, as shown in FIGS. 3-5. The hydraulic oil lubricates the internals of the hydraulic PTO 5 within both the tower housing 70 and the clutch housing 50 and is configured to operate with a gravity drain to a common sump 80. The sump 80 collects the hydraulic oil under the power of gravity and, as a result, is at the lowest point of the clutch housing 50. Once in the sump 80, the hydraulic oil can then be scavenged by a pump and recirculated throughout the hydraulic PTO 5 to lubricate the various internal parts.

The internal structure of the hydraulic PTO 5 may be seen in FIG. 3, which shows a cross-sectional view along the section line A:A of FIG. 2. In order to allow the tower housing 70 to be clocked with respect to the clutch housing 50, a multi-position adapter 26, or baffle plate, is placed between the tower housing 70 and the clutch housing 50. The multi-position adapter 26 includes a plurality of holes that accept fasteners 52 (FIG. 2) to pass through and allow the tower housing 70 and clutch housing 50 to be mated together under clamping force of the fasteners 52.

A main hydraulic oil supply passage 106 and a forced lube supply port 104 provide the initial hydraulic oil supply for the hydraulic PTO 5. As shown in FIG. 2, the main oil supply passage 106 and the forced lube supply port 104 are both proximate the sump 80 on the clutch housing 50. For this reason, the main oil supply passage 106 and the forced lube supply port 104 require the assistance of gravity to ensure a continuous supply of hydraulic oil in the sump 80. As discussed above, the sump 80 on the clutch housing 50 is required to be mounted to the tower housing 70 in an orientation as shown in FIG. 2 to allow gravity to maintain the hydraulic oil level within the sump.

Transitioning now to FIG. 4, a detailed view of Details B and C of FIG. 3 is shown. Detail B is on the lower portion of the clutch housing 50. The multi-position adapter 26 may be indexed to create an oil annulus 100 which lines up to an inbound oil passage 102 to flow hydraulic oil from the clutch housing 50, around the oil annulus 100, and then flow to the tower housing 70 though the outbound oil passage 96. The oil annulus 100, as shown, is contained by the face and outside diameter of the clutch housing 50, the inside diameter of the multi-position adapter 26, and the face of the tower housing 70. The multi-position adapter 26 includes seals 92 which are better seen in Detail C of FIG. 3.

As shown in Detail C of FIG. 4, seals 92 are located on each side of the multi-position adapter 26 to prevent the flow of hydraulic oil around the multi-position adapter 26. The hydraulic oil flows through the oil annulus 100 and is restricted by the body of the multi-position adapter 26 and seals 92 on each side of the multi-position adapter 26 to flow outbound through oil passage 96. After hydraulic oil flows through the outbound oil passage 96, it can then feed the pump pads 75 within the tower housing 70. In short, a plurality of oil passages is networked within each one of the tower housing 70 and the clutch housing 50. The network of oil passages within each respective housing are machined such that they communicate with each other to pass hydraulic oil back and forth. This allows for lubrication of the entire hydraulic PTO 5 with a simple pumping system and a common pump.

When the tower housing 70 is attached to the clutch housing 50, the network of oil passages are lined up to one another to allow for this common oil communication. The multi-position adapter 26 is therefore machined to include a plurality of pass-through ports and oil blocking ports to allow communication of hydraulic oil for proper flow between the housings and to block it where necessary, depending on the orientation of the tower housing 70 to the clutch housing 50, as discussed in detail with respect to FIGS. 6-11.

After the hydraulic oil has circulated through both the tower housing 70 and the clutch housing 50, it may then be drained back by gravity to the sump 80. As shown in FIG. 5, a sump drain opening 32 allows the return of spent hydraulic oil from the tower housing 70 into the sump 80 where the hydraulic oil may be picked up for re-pumping through the hydraulic PTO 5. The multi-position adapter 26 prevents the hydraulic oil from flowing into an improper port machined into the tower housing 70 and clutch housing 50 and maintains the proper path of oil supply and oil draining.

Figure 6:
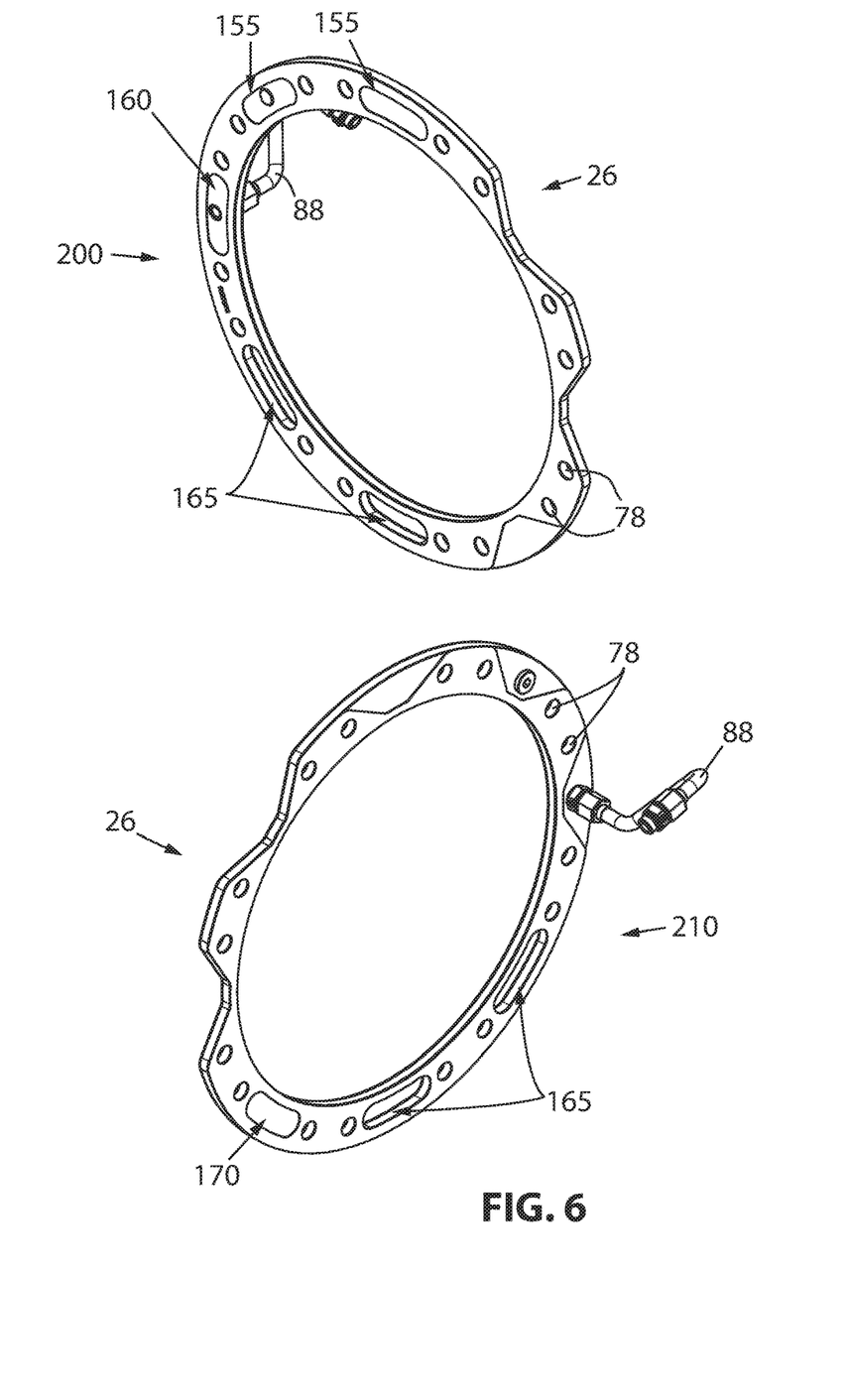
FIG. 6 is a raised perspective view of a multi-position adapter configured for use with the hydraulic PTO of FIG. 2 showing a tower housing side and a clutch housing side of the same multi-position adapter.

For example, FIG. 6 shows the tower housing side 200 and the clutch housing side 210 of the multi-position adapter 26. Looking to the tower housing side 200 of the multi-position adapter 26, a plurality of through-hole openings 78 is shown. The through-hole openings 78 are used for the fasteners 52 (FIG. 2) to connect the clutch housing 50 (FIG. 2), multi-position adapter 26, and the tower housing 70 (FIG. 2). Blocked passages 155 block oil passages that are not used when the tower housing 70 is indexed in certain configurations. Passages 165 lead the spent hydraulic oil to drain back to the sump 80 (FIG. 2) Similarly, looking at the clutch housing side 210 of the multi-position adapter 26, blocked ports 170 restrict the exit of hydraulic oil from the clutch housing 50, and also shows the other side of passages 165 that allow the flow of spent hydraulic fluid to enter the sump 80 (FIG. 2). Both the multi-position adapter 26 and the tower housing 70 can be indexed into a plurality of positions thus allowing hydraulic oil to communicate between the tower housing 70 and the clutch housing 50 while maintaining the proper flow of oil with a gravity-assisted drain back to the sump 80. In order to prevent air pockets or vacuum buildup of hydraulic oil within the various passages, a vent line 88 may be installed into the multi-position adapter 26 with allows for pressure equalization of the various oil ports within the hydraulic PTO 5.

Regardless of the angularly indexed position of the tower housing 70 with respect to the clutch housing 50, the vent line 88 may be adjusted to connect the multi-position adapter 26 to the clutch housing 50 thus allowing for proper ventilation and ensuring proper oil flow within the hydraulic PTO 5.

FIGS. 7-11 each shows the hydraulic PTO 5 configured with the tower housing 70 angularly indexed with respect to the clutch housing 50. In each one of FIGS. 7-11, the clutch housing 50 remains in the same position, with the sump 80 at the lowest point, or in the "six o'clock" position. Above the hydraulic PTO 5 in each one of FIGS. 7-11, the multi-position adapter 26 includes vent line 88, and is shown from the tower housing side 200 and the clutch housing side 210.

Each of FIGS. 6-11 shows a vent line passage 160, which connects the air cavity in tower housing 70 (FIG. 3) to an auxiliary vent line 88, which connects to the air cavity at the output end 60 (FIG. 3) to ensure proper drainage to the sump 80 (FIG. 3). In each one of these respective views, the multi-position adapter 26 is shown to be indexed along with the tower housing 70 to match up the various hydraulic oil passages properly. As previously discussed, the hydraulic oil is picked up at the sump 80 and circulated through both the clutch housing 50 and the tower housing 70 while passing through the multi-position adapter 26. The multi-position adapter 26 therefore allows for the indexing of the tower housing 70 which also indexes the pump pads 75 thus allowing for a number of different configurations of the hydraulic PTO 5. Ultimately, the large number of configurations illustrated in FIGS. 7-11 allows the hydraulic PTO 5 to be installed in a large number of unique applications without ancillary hydraulic lines, pumps, or reservoirs with a simplified gravity-assisted drain and common sump 80.

Figure 7:
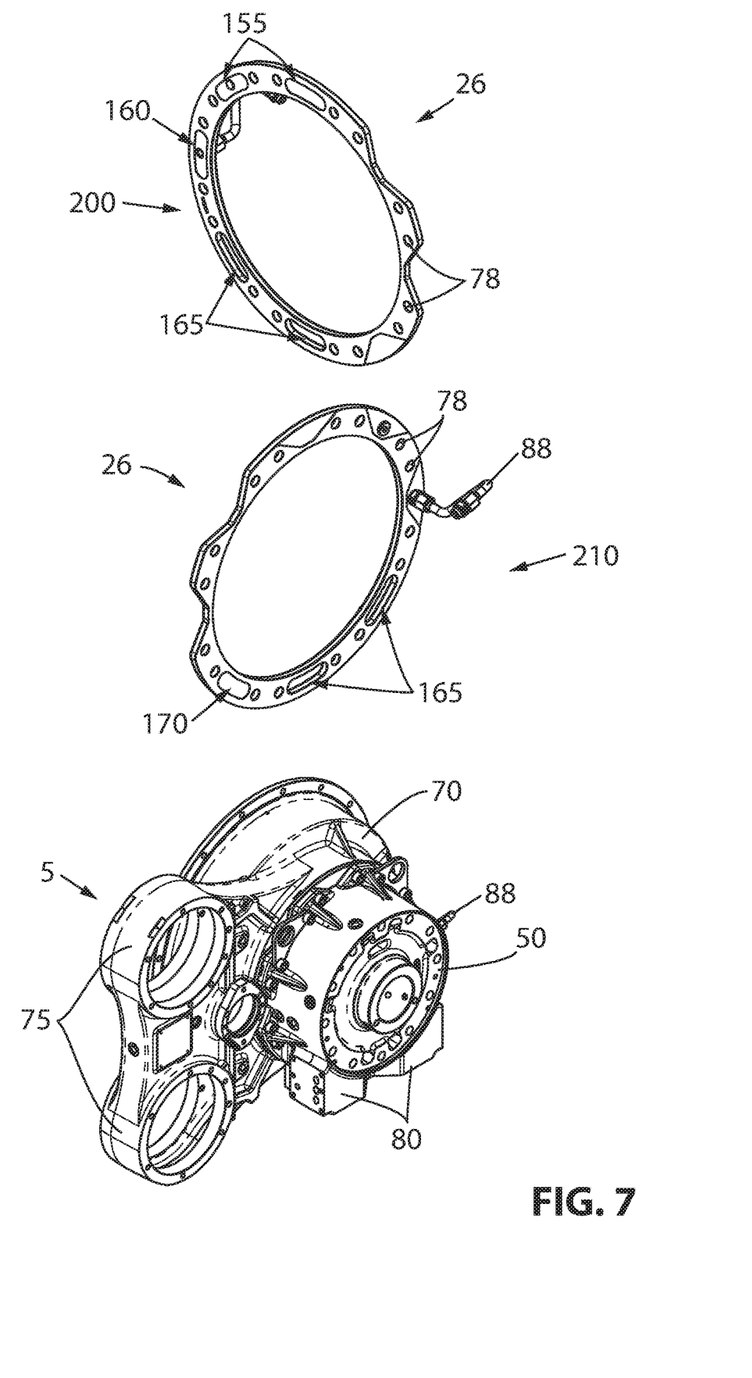
FIG. 7 is a raised perspective view of the hydraulic PTO using the multi-position adapter with the tower housing in a first, angularly indexed position.
Figure 8:
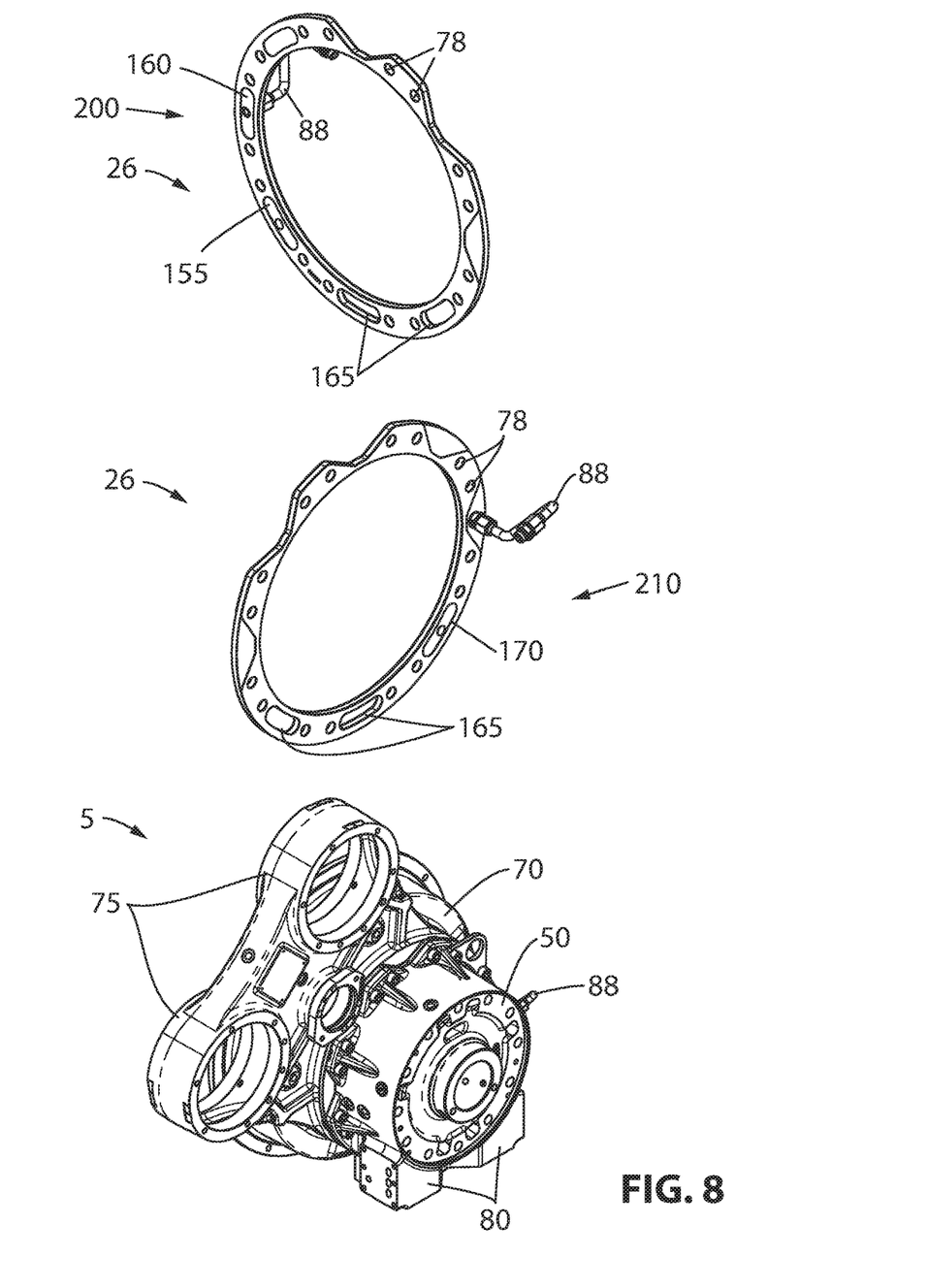
FIG. 8 is a raised perspective view of the hydraulic PTO using the multi-position adapter with the tower housing in a second, angularly indexed position.
Figure 9:
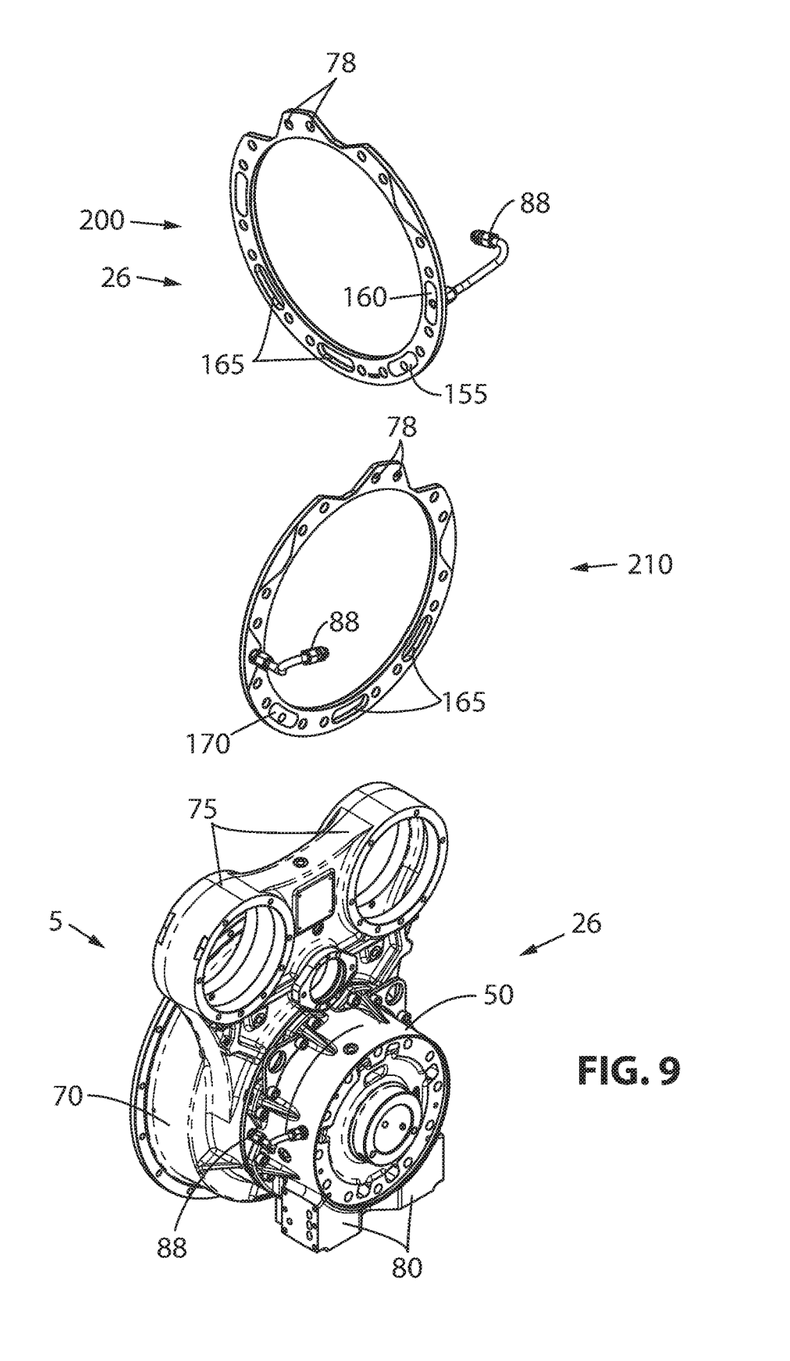
FIG. 9 is a raised perspective view of the hydraulic PTO using the multi-position adapter with the tower housing in a third, angularly indexed position.
Figure 10:
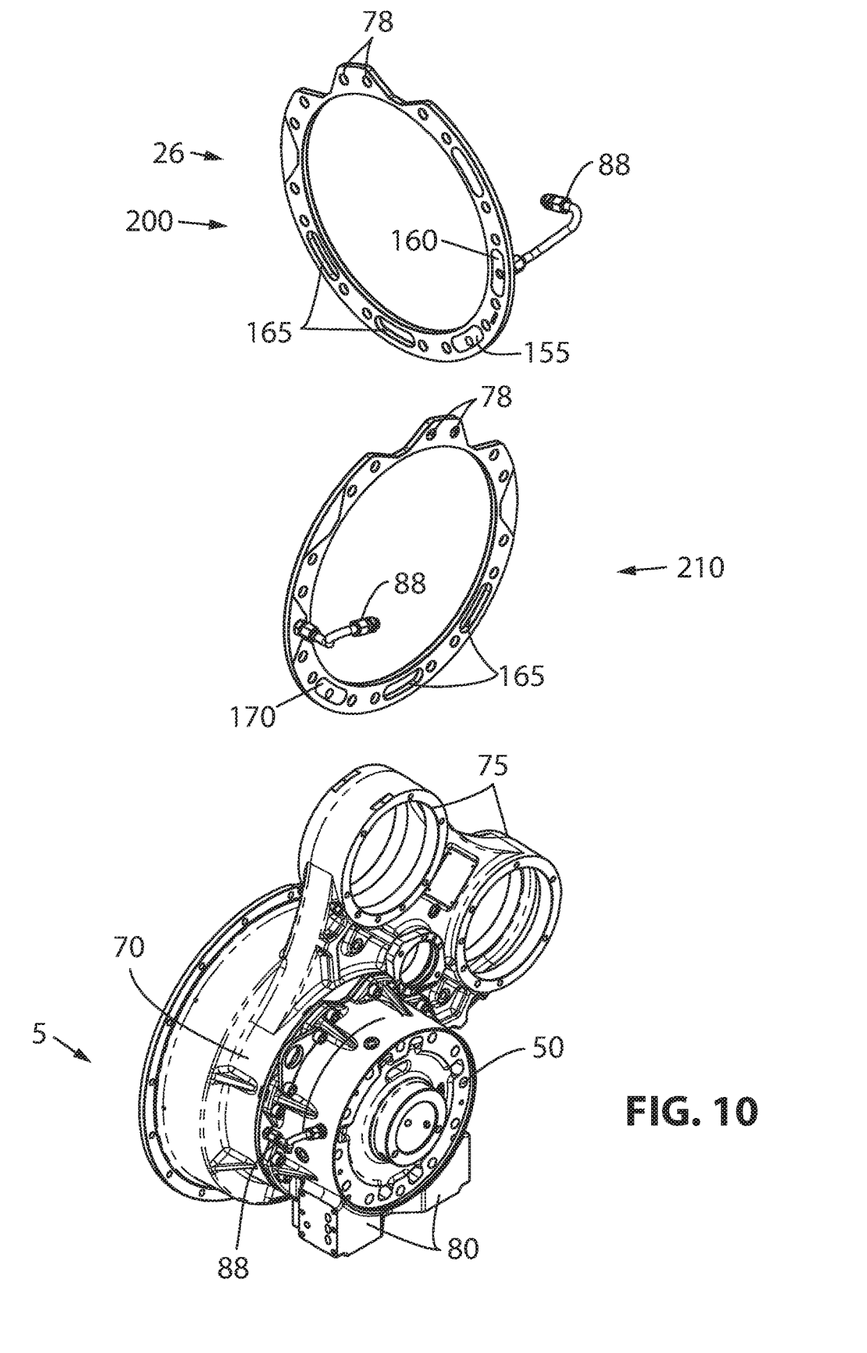
FIG. 10 is a raised perspective view of the hydraulic PTO using the multi-position adapter with the tower housing in a fourth, angularly indexed position.

The unique configuration and adjustment of the multi-position adapter 26 allows the oil flow within the hydraulic PTO to be altered. For example, the indexed configuration of the tower housing 70 with respect to the clutch housing 50, as shown in FIG. 7, will require a unique oil flow to that as shown in FIG. 9. This is due, in part, to the gravity assistance of the oil drain that ensures the hydraulic oil flows back to the sump 80. Without being able to change the flow of oil between the tower housing 70 and the clutch housing 50, the sump 80 would not be at the lowest point, thus preventing an internal oil pickup from getting the necessary oil. Additionally, not being able to adjust the flow of oil between the tower housing 70 and the clutch housing 50 could cause oil to pool within certain parts of the tower when the pump pads 75 are adjusted such that they are at low points; see, for example, FIGS. 7 and 11.

Figure 11:
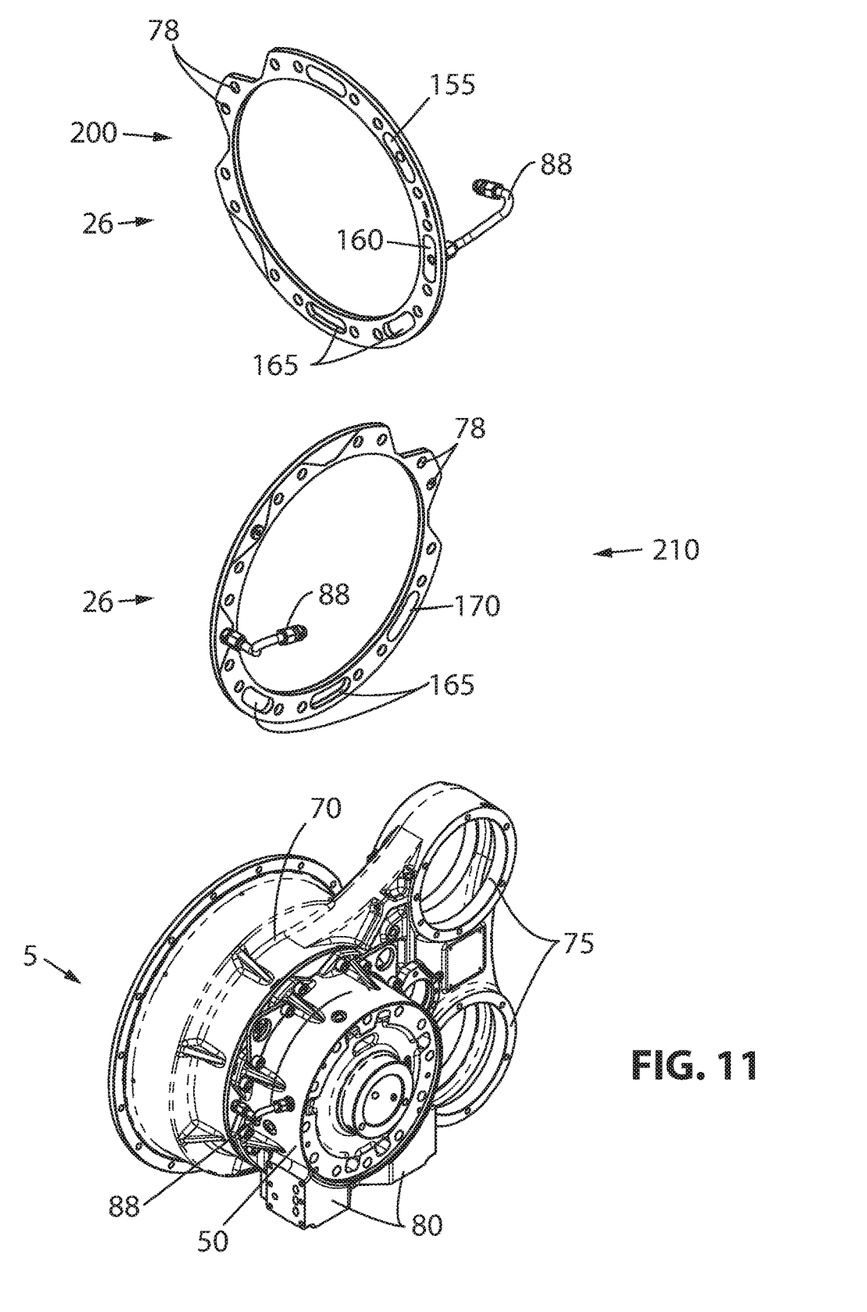
FIG. 11 is a raised perspective view of the hydraulic PTO using the multi-position adapter with the tower housing in a fifth, angularly indexed position.

Each Figure additionally shows the other side of passages 165 that allow the flow of spent hydraulic fluid to enter the sump 80 (FIG. 2). The various positions in which the tower housing 70 and the clutch housing 50 may be indexed with respect to one another are not limited by what is shown in FIGS. 7 and 11. The multi-position adapter may be uniquely manufactured with any number of through-holes 78, blocked ports 170, opening passages 165, and the like. As a result, it is foreseeable that the tower housing 70 may be indexed in an infinite amount of positions with respect to the clutch housing with a properly machined multi-position adapter 26. In the preferred embodiment shown, the multi-position adapter 26 is pre-manufactured with a number of different positions corresponding to the various oil inlet and outlets on each respective housing, thus allowing for a finite amount of pre-determined, indexed positions. Additionally, FIGS. 7-11 illustrate blocked passages 155 that block oil when the tower housing 70 is indexed in certain configurations.

Therefore, the clutch housing 50 and tower housing 70 having different openings that can communicate with each other, with respective ones that are blocked from liquid-flow communication with each other, can be accommodated using the multi-position adapter 26. For example, the tower housing 70 may have five openings so that no matter which position the tower housing 70 is oriented, there is always one opening at a six o'clock position. The clutch housing 50 may have three openings, with one at a six o'clock position, a second partial opening arranged to the right so that with the multi-position adapter 26 sandwiched between the clutch and tower housings, 50, 70, in a particular orientation of the multi-position adapter 26, will always have at least two openings in liquid-flow communication between the clutch and tower housings, 50, 70. This ensures that oil can always flush back into the sump 80 regardless of the orientation of the tower housing 70 relative to the clutch housing 50.

The multi-position adapter is also preferably machined out of a flat piece of stock such as aluminum, iron, or steel, but may be made out of any other durable material. The various passages and ports described above in FIG. 6 need not be precision drilled. The multi-position adapter 26 acts as a large gasket between the clutch housing and the tower housing allowing for the communication of hydraulic oil between the two respective housings in a number of different orientations, as shown in FIGS. 7-11. As a result, it is also envisioned that the multi-position adapter 26 may be made out of a compressible material such as a gasket material. The multi-position adapter 26 also requires a thickness to allow for hydraulic oil to pass through from the clutch housing 50 to the tower housing 70. The multi-position adapter 26 must also have a thickness of sufficient size to allow for the flow of hydraulic oil within the multi-position adapter 26 itself. This is best shown in FIG. 6 on the tower housing side 200. Passages 165 are cut into the thickness of the multi-position adapter 26 but not through the entire width, whereby the passages 165 provide oblong openings. These passages 165 may also be extended within the core of the multi-position adapter 26. It is also envisioned that the multi-position adapter may be made out of a multi-layer product where the passages are created with multiple laminations of each successive layer.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. An industrial hydraulic power take-off "PTO", comprising:
 a housing mounted between a prime mover and a piece of driven equipment, the housing including,
  a hydraulic section having a clutch housing with multiple passages directing oil through the PTO;
  a tower housing having multiple passages directing oil through the tower housing, the tower housing configured to connect to the clutch housing in multiple angularly indexed positions with respect to the clutch housing; and
  a multi-position adapter arranged between the tower and clutch housings, the multi-position adapter having spaced apart openings that align with various passages of the hydraulic and tower housings, wherein selecting an angularly indexed position of the multi-position adapter defines corresponding oil flow paths between respective ones of the passages of the hydraulic and tower housing and blocks flow through the remainder of the passages of the hydraulic and tower housings.

2. The power take-off of claim 1, further comprising an oil sump located at a lower portion of the housing, wherein the oil sump receives a volume of hydraulic oil.

3. The power take-off of claim 2, further comprising a lube pump, wherein said lube pump recirculates oil received in the oil sump throughout the multiple passages.

4. The power take-off of claim 3, further comprising a vent coupled to the multi-position adapter and located at a distal end of a multiple passage of oil throughout the PTO.

5. The power take-off of claim 1, further comprising a spring applied, hydraulically released brake.

6. The power take-off of claim 5, further comprising a mechanical brake release.

7. The power take-off of claim 5, further comprising an oil-filled, multiple disc, hydraulically-actuated, self-adjusting clutch.

8. The power take-off of claim 7, further comprising a hydraulic gear pump.

9. An industrial hydraulic power take-off "PTO" mounted between a prime mover and a piece of driven equipment, the PTO comprising:
   a tower housing having multiple openings connected to a network of oil passages within the tower housing directing hydraulic oil through the tower housing;
   a clutch housing having a clutch for selectively transmitting power from the prime mover to the piece of driven equipment, the clutch housing having a sidewall with a forward end defining a face with multiple openings connected to multiple passages directing oil through the clutch section; and
   a multi-position adapter arranged between the tower housing and the clutch housing, the multi-position adapter having,
      blocking portions defining solid wall segments preventing oil flow through the multi-position adapter blocking portions, and
      passage portions having openings extending through respective solid wall segments permitting oil flow through the multi-position adapter passage portions,
   wherein the multi-position adapter is configured to mount in multiple angularly indexed positions with respect to the tower housing and clutch housing to permit oil flow through respect pairs of openings of the faces of the tower housing and prevent oil flow through the remainder of the openings of the faces of the tower housing and the clutch housing based on an angular indexed position of the tower housing relative to the clutch housing.

10. The multi-position adapter of claim 9, further comprising a vent coupled to the multi-position adapter and located at a distal end of a multiple passage of oil throughout the PTO.

11. The multi-position adapter of claim 9, wherein the multi-position adapter is machined out of at least one material of the following: aluminum, iron and steel.

* * * * *